US010119639B2

(12) United States Patent
Wüst (10) Patent No.: US 10,119,639 B2
(45) Date of Patent: Nov. 6, 2018

(54) PLUG-TYPE SLEEVE

(71) Applicant: Theodor Wüst, Rüti ZH (CH)

(72) Inventor: Theodor Wüst, Rüti ZH (CH)

( * ) Notice: Subject to any disclaimer, the term of this patent is extended or adjusted under 35 U.S.C. 154(b) by 148 days.

(21) Appl. No.: 15/270,653

(22) Filed: Sep. 20, 2016

(65) Prior Publication Data

US 2017/0009917 A1      Jan. 12, 2017

Related U.S. Application Data

(63) Continuation of application No. PCT/CH2015/000038, filed on Mar. 9, 2015.

(30) Foreign Application Priority Data

Mar. 20, 2014 (CH) ........................................ 428/14

(51) Int. Cl.
*F16L 17/10* (2006.01)
*F16L 21/08* (2006.01)

(52) U.S. Cl.
CPC ............... *F16L 21/08* (2013.01); *F16L 17/10* (2013.01)

(58) Field of Classification Search
CPC ....... F16L 21/005; F16L 17/025; F16L 17/04; F16L 17/10
USPC .............................. 285/96, 97, 109, 311, 105
See application file for complete search history.

(56) References Cited

U.S. PATENT DOCUMENTS

| | | | | | |
|---|---|---|---|---|---|
| 1,930,361 | A | * | 10/1933 | Kilmer, Jr. | ............... E21B 33/06 285/97 |
| 2,291,143 | A | * | 7/1942 | Brown | ................ E21B 33/0422 285/96 |
| 2,826,420 | A | * | 3/1958 | Klingler | ............ B23B 31/16287 285/96 |

(Continued)

FOREIGN PATENT DOCUMENTS

| | | | |
|---|---|---|---|
| FR | 2 166 593 | A5 | 8/1973 |
| GB | 556 256 | A | 9/1943 |

(Continued)

OTHER PUBLICATIONS

International Search Report (PCT/ISA/210) dated May 28, 2015, by the European Patent Office as the International Searching Authority for International Application No. PCT/CH2015/000038.

(Continued)

*Primary Examiner* — David Bochna
(74) *Attorney, Agent, or Firm* — Buchanan Ingersoll & Rooney PC (57) ABSTRACT

A plug-type sleeve for fastening on an object which is, in particular, in the form of a rod, cable or pipe, and which includes an end which has an opening for receiving a section of the object and has a circumferential groove with annular seal which is composed of an elastomeric material arranged in it, it being possible for the plug-type sleeve to be placed against an outer surface of said section. The plug-type sleeve includes a substantially sleeve-like clamping element, which can be coupled to the annular seal in the longitudinal direction of the plug-type sleeve, for axial compression and resulting radial constriction of the annular seal, wherein the clamping element is formed and designed such that external application of a fluid pressure medium causes axial extension of the clamping element.

20 Claims, 10 Drawing Sheets

(56) References Cited

U.S. PATENT DOCUMENTS

| | | | | | |
|---|---|---|---|---|---|
| 3,097,866 | A | * | 7/1963 | Iversen | F16L 33/16 285/96 |
| 3,271,053 | A | * | 9/1966 | Kurachi | F16L 33/224 24/493 |
| 3,737,139 | A | * | 6/1973 | Watts | F16L 17/10 251/1.2 |
| 3,810,665 | A | * | 5/1974 | Rodgers | F16L 17/10 285/105 |
| 3,843,167 | A | | 10/1974 | Gronstedt | |
| 3,986,737 | A | * | 10/1976 | Krusche | F16L 19/062 285/341 |
| 4,150,250 | A | * | 4/1979 | Lundeberg | H02G 3/065 285/354 |
| 4,178,020 | A | * | 12/1979 | Dopyera | F16L 37/002 285/96 |
| 4,195,865 | A | * | 4/1980 | Martin | F16L 27/12 285/311 |
| 4,371,198 | A | * | 2/1983 | Martin | F16L 27/12 285/145.1 |
| 4,431,215 | A | * | 2/1984 | Moyer | F16L 37/002 285/18 |
| 4,676,531 | A | * | 6/1987 | Martin | F16L 17/10 285/97 |
| 9,068,423 | B2 | * | 6/2015 | Johnson | E21B 33/038 |
| 9,074,450 | B2 | * | 7/2015 | Weir | E21B 33/06 |

FOREIGN PATENT DOCUMENTS

| | | | | |
|---|---|---|---|---|
| GB | | 1271855 A | * 4/1972 | F16L 17/10 |
| WO | WO 00/53964 A1 | | 9/2000 | |

OTHER PUBLICATIONS

Written Opinion (PCT/ISA/237) dated May 28, 2015, by the European Patent Office as the International Searching Authority for International Application No. PCT/CH2015/000038.

\* cited by examiner

PLUG-TYPE SLEEVE

RELATED APPLICATIONS

This application claims priority as a continuation application under 35 U.S.C. § 120 to PCT/CH2015/000038, which was filed as an International Application on Mar. 9, 2015 designating the U.S., and which claims priority to Swiss Application 428/14 filed in Switzerland on Mar. 20, 2014. The entire contents of these applications are hereby incorporated by reference in their entireties.

FIELD

The present invention relates to a plug-type sleeve.

BACKGROUND INFORMATION

For connecting pipes, such as plastic pipes, plug-type sleeves are often used, into which sleeves the end sections of the pipes to be connected are fitted from two opposite sides and then are snugly secured therein. Alternatively, the plug-type sleeves can also be designed on the end of a pipe.

In the case of a widely available type of such plug-type sleeves, the securing is done by means of O-rings made of elastomeric material, which at the same time also provide for the necessary sealing of the connection. The O-rings are located in circumferential grooves of the plug-type sleeves and are squeezed radially during the fitting of the end sections of the pipe or pipes to be connected between an inner wall of the plug-type sleeve and the outer surfaces of the end sections, so that they rest snugly on the outer surfaces of the end sections and hold tightly by friction the end sections of the pipes.

Such plug-type sleeves are very simple structurally and no additional aids are necessary for connecting the pipes. However, such plug-type sleeves are often not used because they require a relatively high amount of energy in order to fit the end sections of the pipes that are to be connected into the plug-type sleeve, since the necessarily strong squeezing of the O-rings offers considerable resistance to the fitting of the end sections. By suitable sizing, the necessary squeezing of the O-rings and thus the resulting resistance can be reduced, but then at the same time, the achievable extraction strength is also decreased, which in many applications is undesirable or unacceptable.

In connection with electric cables, plug-type sleeves (e.g., for cable fittings), are used for traction relief. In most cable fittings, which must guarantee sealing and a specific extraction force, an O-ring that consists of soft rubber is arranged in the plug-type sleeve, which is axially clamped by means of a union nut and as a result can be squeezed radially inward, whereby it presses on the cable jacket and thus holds the cable tightly. For pipe connections, such plug-type sleeves with union nuts are only conditionally suitable, however.

SUMMARY

A plug-type sleeve for fastening to an object that is in the form of a rod, cable or pipe is disclosed, the sleeve comprising: a first end, which has an opening for accommodating a section of an object; and a clamping element which can be placed on an outer surface of the section, the clamping element having an essentially sleeve-like tightening element configured to be coupled for shear to the clamping element in a longitudinal direction of the plug-type sleeve for imposing an axial force on the clamping element, the clamping element being molded and configured so that when an axial force is imposed, the clamping element will be constricted in a radial direction, the tightening element being configured and arranged so that a fluid pressure medium when externally imposed will produce an axial elongation of the tightening element and thus the imposing of an axial force on the clamping element.

BRIEF DESCRIPTION OF THE DRAWINGS

Exemplary features and advantages will be explained in more detail and better understood from a reading of the detailed description which follows in conjunction with embodiments depicted in the drawings. In the drawings.

For the description below, the following convention applies: if not all parts are provided with reference numbers in a figure, reference is made to the respective other figures in connection with the related parts of the description in each case. Axial direction or longitudinal direction is defined as the direction in which in practical use, the object to be connected with the plug-type sleeve is fitted into the plug-type sleeve or the plug-type sleeve is pushed onto the object. Accordingly, radial is defined as each direction that is perpendicular to the longitudinal direction.

DETAILED DESCRIPTION

A universal plug-type sleeve is disclosed, which sleeve is distinguished by a simple design and virtually effortless assembly and with which simultaneously, in addition to a reliable seal, an extremely high extraction strength can also be achieved.

In its most general form, the essence of an exemplary plug-type sleeve according to the present disclosure, is as follows: a plug-type sleeve for fastening onto an object that is in particular in the form of a rod, cable or pipe includes a first end, which has an opening for accommodating a section of the object and a clamping element, which can be placed on an outer surface of the above-mentioned section, and an essentially sleeve-like tightening element that can be coupled for shear to the clamping element in the longitudinal direction of the plug-type sleeve for imposing an axial force on the clamping element, whereby the clamping element is molded and designed in such a way that it is constricted when axial force is imposed in the radial direction, and whereby the tightening element is designed and arranged in such a way that imposing a fluid pressure medium externally produces an axial elongation of the tightening element and as a result the imposing of the axial force on the clamping element.

According to an exemplary embodiment, an essence of the embodiment is as follows: a plug-type sleeve for fastening to an object that is in particular in the form of a rod, cable or pipe includes a first end, which has an opening for accommodating a section of the object and a circumferential groove with an O-ring arranged therein, and which can be placed on an outer surface of the above-mentioned section, and an essentially sleeve-like tightening element that can be coupled for shear to the O-ring in the longitudinal direction of the plug-type sleeve for axial compression and resulting radial constriction of the O-ring, whereby the tightening element is molded and designed so that imposing a fluid pressure medium externally produces an axial elongation of the tightening element.

As an alternative, the clamping element has an essentially conical annular element on its exterior, which works together with an exemplar essentially mirror-inverted conical mating surface, made in the first end, so that the annular element can move axially by imposing the axial force relative to the mating surface and in this case can be constricted radially.

Because of the special design of the tightening element, on the one hand, the section of the object can be inserted virtually effortlessly into the plug-type sleeve and, on the other hand, an extremely good sealing action as well as an extremely high extraction strength can be achieved.

According to an exemplary aspect disclosed herein, the tightening element is designed to be able to be converted from an initial configuration via a dead-center configuration into an end configuration, whereby the length of the tightening element in the initial configuration is the smallest, in the dead-center configuration the largest, and in the end configuration somewhat smaller than in the dead-center configuration but larger than in the initial configuration.

According to another exemplary aspect disclosed herein, the tightening element has a snap function, whereby the tightening element switches stepwise from its dead-center configuration into its end configuration and remains in the latter without a force being imposed externally.

According to another exemplary aspect disclosed herein, the tightening element is designed in such a way that it is curved or bent outward essentially like a barrel in its initial configuration, essentially stretches out in its dead-center configuration, and is curved or bent inward essentially like a cushion in its end configuration.

In the first end, a circumferential chamber can be configured, the tightening element is arranged in the chamber in the longitudinal direction next to the clamping element, and the tightening element extends in the longitudinal direction essentially from a frontal boundary area of the chamber to the clamping element, whereby the tightening element, at least in a middle section, is designed and configured to deform radially inward, whereby the radial inward deformation of the tightening element produces an elongation in the longitudinal direction, and whereby axial force is imposed on the clamping element by the elongation of the tightening element.

The plug-type sleeve suitably has a connection for a fluid pressure medium that empties into the circumferential chamber.

The connection is suitably provided with a removable or breakable seal.

According to another exemplary aspect disclosed herein, the tightening element has a first carrier ring and, at a distance to the latter, a second carrier ring, and, between the two carrier rings, a number of pairs of plate-like links, whereby in each case, the links of one pair are arranged next to one another in the longitudinal direction and are linked in such a way as to be able to pivot toward one another, and whereby in each case, a link of one pair on the first carrier ring and the other link of one pair on the second carrier ring are linked in such a way as to be able to tilt, and whereby in each case, the two links of one pair are arranged inclined toward one another.

In this case, the links and the carrier rings can be surrounded by an elastic sealing hose.

According to an exemplary embodiment, the clamping element includes an O-ring, which is supported on a circumferential surface of the groove, on the one hand, and on a collar of the groove, on the other hand, and a circumferential chamber that connects to the groove is made in the first end, whereby the tightening element is arranged in the chamber in the longitudinal direction next to the O-ring, and extends in the longitudinal direction essentially from a front boundary surface of the chamber up to an O-ring, and whereby the tightening element, at least in a middle section, is designed and configured to deform radially inward, whereby the radial inward deformation of the tightening element produces an elongation of the tightening element in the longitudinal direction, and whereby the O-ring is axially compressed by the elongation of the tightening element.

The plug-type sleeve can, for example, include a support sleeve that can be fitted into a tube-like object to improve stability.

The plug-type sleeve can be provided with an indicator, which indicates whether the tightening element occupies its initial configuration or its end configuration.

According to another exemplary aspect disclosed herein the plug-type sleeve has a second end that is designed, configured and equipped with a first end and that is in one piece or is connected and is essentially the same as the first end. As a result, the plug-type sleeve can be used for connecting two objects, such as pipes.

In this case, the clamping elements or actual O-rings can be arranged in the two ends on the sides of the two ends that face one another.

Suitably in this case, one separate connection each for a fluid pressure medium is provided on the first end and on the second end. As an alternative, the plug-type sleeve can also have a connection for a fluid pressure medium that is common to both ends.

Figure 1:
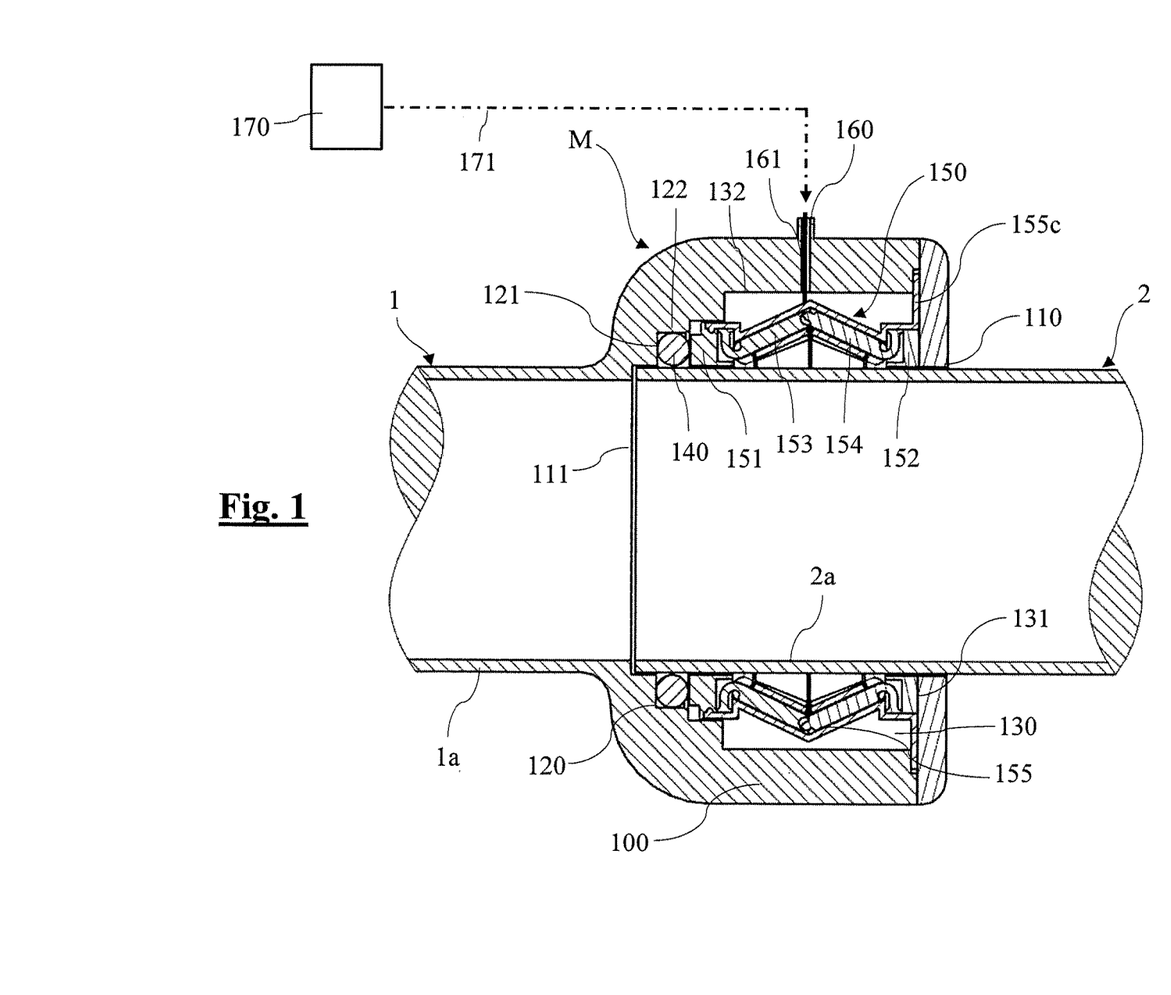
FIG. 1 shows a longitudinal section through a first exemplary embodiment of a plug-type sleeve according to the present disclosure in an unclamped state.
Figure 2:
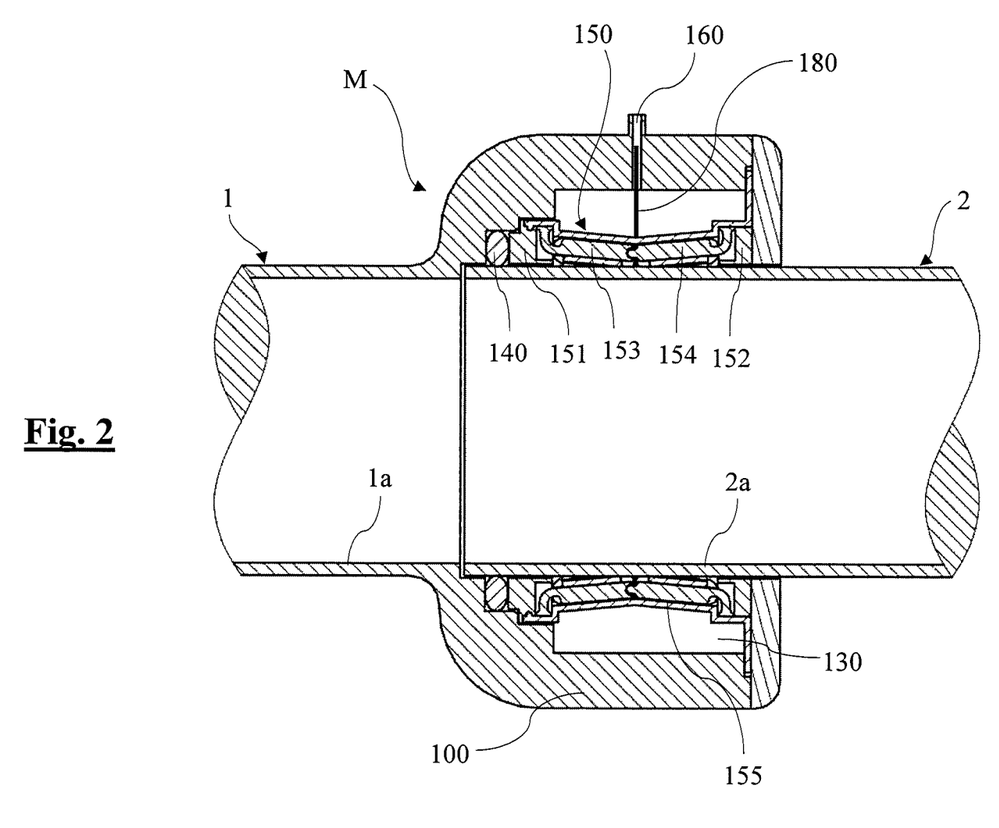
FIG. 2 shows a longitudinal section analogous to FIG. 1, but in a clamped state.

Referring to FIGS. 1 and 2, the plug-type sleeve referred to as a whole with M, is designed and configured on the end section 1a of a pipe 1. It includes a first end 100 with an opening 110, through which an end section 2a of a pipe 2 that is to be connected to the plug-type sleeve M is fitted into the plug-type sleeve up to a stop collar 111 made in the latter. A circumferential groove 120 with an annular collar 121 and a circumferential surface 122 as well as a circumferential chamber 130 are made in the end 100 with an annular lateral boundary surface 131 and a circumferential surface 132. A clamping element in the form of an O-ring 140 that includes (e.g., consists of) an elastomeric (or other) material is inserted into the groove 120, which material is supported on the collar 121 and the circumferential surface 122 of the groove 120. An essentially sleeve-like tightening element that is referred to as a whole with 150 is arranged in the chamber 130, which element extends in longitudinal direction from the lateral boundary surface 131 of the chamber 130 to the O-ring 140. The O-ring 140 and the sleeve-like tightening element 150 surround the end section 2a of the pipe 2 that is located in the plug-type sleeve. A connection 160 for a fluid pressure medium is arranged outside on the end 100 of the plug-type sleeve, which connection empties into the chamber 130 via a hole 161. A fluid pressure medium can be supplied from a pressure medium container 170 into the chamber 130 of the plug-type sleeve via the connection 160 (e.g., via a line 171). Instead of the pressure medium container, a suitable pressure medium pump or a compressor can also be provided.

Figure 3:
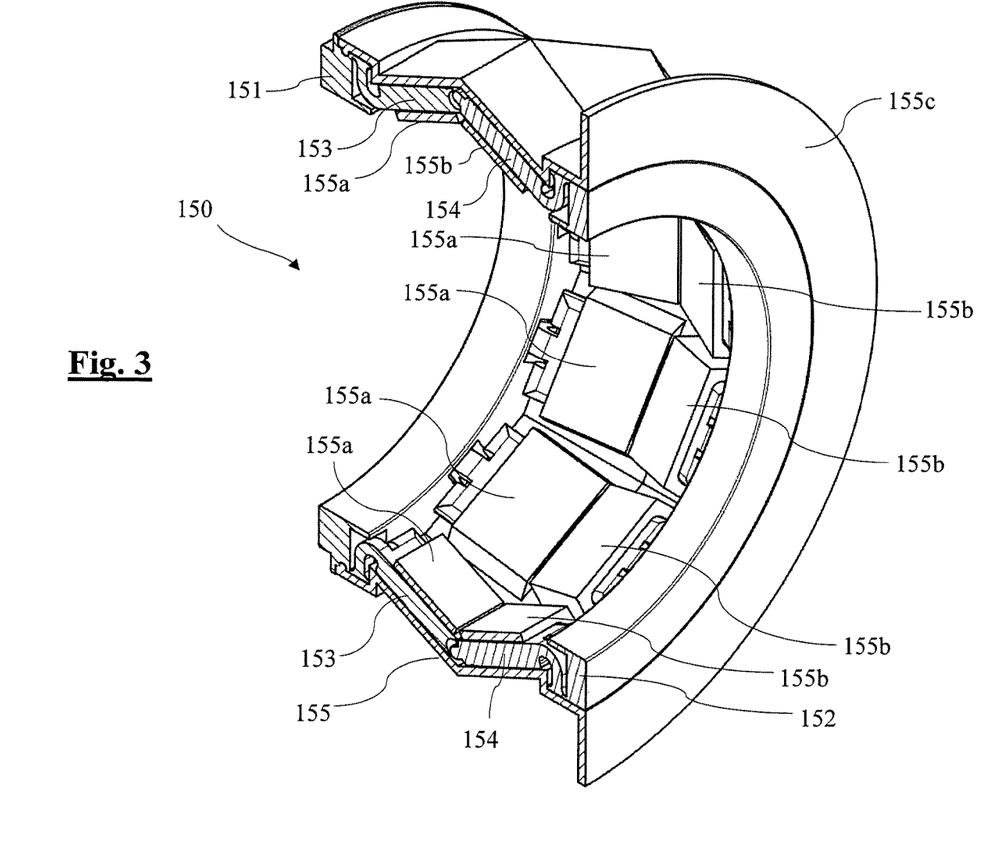
FIG. 3 shows a cutaway oblique view of a tightening element of the plug-type sleeve of FIG. 1.
Figures 4, 5:
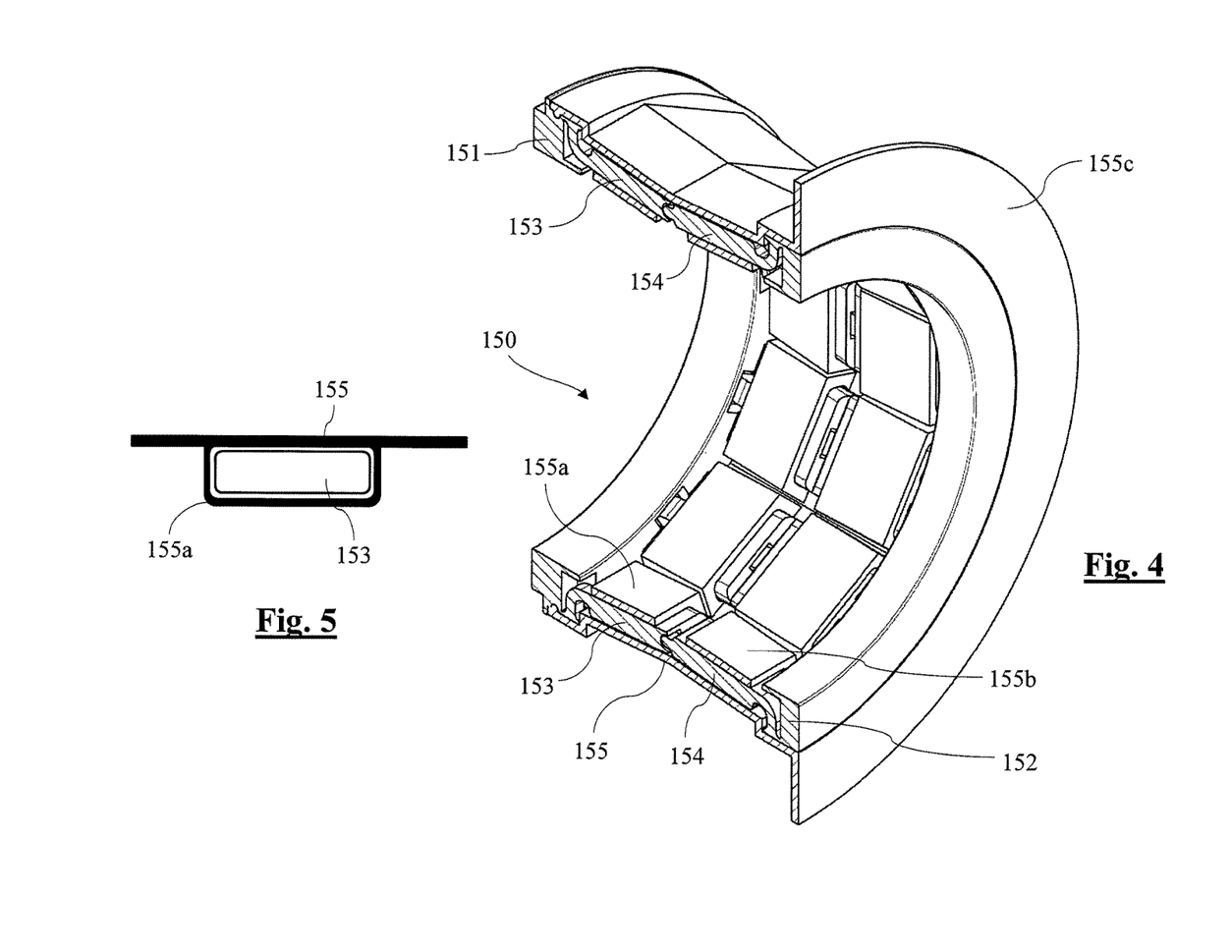
FIG. 4 shows a cutaway oblique view of a tightening element of the plug-type sleeve of FIG. 2.
FIG. 5 shows a diagrammatic detail section through a tightening element.

A more detailed design of the sleeve-like tightening element 150 is evident from the oblique views of FIGS. 3 and 4. It includes a first carrier ring 151 and a second carrier ring 152 at some distance from the first carrier ring in the axial direction. Between the two carrier rings 151 and 152, multiple (e.g., ten) pairs of plate-like links 153 and 154 are suspended, which together form a jacket of the tightening element 150. The two carrier rings 151 and 152 and the plate-like links 153 and 154 are surrounded by an elastic sealing hose 155, which on one side has a radially outward-projecting fastening flange 155c. On the inside, the sealing hose 155 is provided with bags 155a and 155b, which surround the links 153 and 154. The latter is in particular also clear from the diagrammatic sectional view of FIG. 5.

The plate-like links 153 and 154 of each pair are arranged next to one another in the longitudinal direction and are linked to one another in such a way as to be able to pivot (in a limited manner). One link 153 of each pair is linked to a carrier ring 151 and the other link 154 is linked to the other carrier ring 152 in such a way as to be able to pivot or tilt (in a limited manner). The two links 153 and 154 of each pair are in each case inclined toward one another, so that the jacket of the tightening element 150 formed by the links 153 and 154 in the middle between the two carrier rings 151 and 152 has a larger diameter than in the vicinity of the carrier rings. Thus, in the area of its jacket or the links 153 and 154, the tightening element 150 has essentially a barrel-like, bulging or bent configuration, which is referred to below as an initial configuration.

Below, an exemplary mode of operation of the plug-type sleeve M is explained.

To fasten the plug-type sleeve M on the end section 2a of the pipe 2 or conversely the end section 2a in the plug-type sleeve M, the end section 2a of the pipe 2, as depicted in FIG. 1, is fitted through the opening 110 into the end 100 of the plug-type sleeve M. Since the O-ring 140 at this time is not yet clamped or compressed, the fitting of the end section 2a can be done virtually effortlessly.

As the next step, the securing of the end section 2a in the plug-type sleeve M is carried out by means of the tightening element 150. To this end, the outer surface of the jacket of the tightening element 150, formed by the links 153 and 154, is exposed to a fluid pressure medium. The pressure medium, which can for example, be compressed air, is to this end introduced into the chamber 130 via the connection 160. Due to the pressure of the tightening element 150, the latter is deformed radially inward, whereby the angle between the links 153 and 154 is flattened until the links 153 and 154 of the pairs in each case lie in a plane. By the inward deformation of the jacket, the two carrier rings 151 and 152 are pressed out from one another, so that the tightening element 150 expands in the longitudinal direction. As a result, the carrier ring 151 of the tightening element 150 presses axially against the O-ring 140 and squeezes the latter in the axial direction. Since the elastomeric material of the O-ring behaves in an almost incompressible manner, the O-ring 140 is constricted radially inward and in this case presses with great force on the outer surface of the end section 2a of the pipe 2, by which the end section is then held tightly by friction.

When the jacket that is formed by the links 153 and 154 is deformed inward, to the extent that the links 153 and 154 in each case of one pair lie in a plane, the tightening element 150 has achieved its largest expansion in the longitudinal direction. The thus stretched-out configuration of the tightening element 150 is referred to below as the dead-center configuration.

As is evident from FIGS. 1 and 2, the links 153 and 154 are located in their areas linked to the carrier rings at a small radial distance via the end section 2a of the pipe 2. This makes it possible for the jacket of the tightening element 150 formed by the links 153 and 154 to be still slightly further radially-inward deformed via the dead-center configuration, until the links 153 and 154 line up on the outer surface of the end section 2a of the pipe 2. In this case, the links 153 and 154 are at a slight angle to one another. In this position of the links 153 and 154, the configuration of the tightening element is essentially slightly curved or bent in the shape of a cushion. This configuration of the tightening element is referred to below as the end configuration. Since the end configuration of the tightening element 150 deviates only slightly from the dead-center configuration, the overall length of the tightening element in this end configuration is also only slightly smaller than in its dead-center configuration. This in turn has the result that the axial pressing force exerted by the tightening element 150 on the O-ring 140 is only insignificantly smaller, and the molding force exerted by the O-ring on the end section 2a of the pipe 2 is thus virtually unimpaired. FIG. 2 shows the plug-type sleeve in the activated or clamped state, in which the tightening element 150 occupies its end configuration. FIG. 4 shows the tightening element 150 in this end configuration.

A type of elbow lever system, which imparts a snap function to the tightening element 150, is formed by the special design and arrangement of the links 153 and 154. This means that the tightening element 150 is deformed abruptly into its end configuration as soon as the inward deformation produced by the pressure medium has gone somewhat beyond the dead-center configuration. The end configuration is stable, and the tightening element remains in this end configuration without imposing a force externally, so that for maintaining the connection, imposing the pressure medium on it is no longer necessary.

Figure 8:
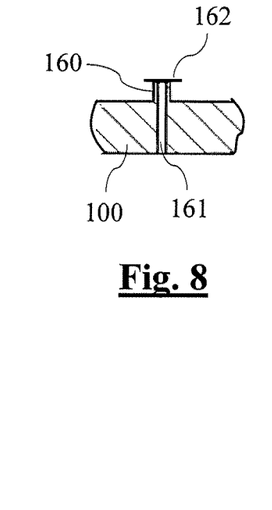
FIG. 8 shows a detail section of an exemplary plug-type sleeve.

As can be seen in particular from FIG. 2, the plug-type sleeve M is provided with an indicator that indicates in what state the tightening element is located. The indicator is designed here as a pin 180, which rises on the jacket of the tightening element 150, formed by the links 153 and 154, and extends radially outward into the opening 161. With the tightening element 150 (FIG. 1) in the non-activated state, the pin 180 projects far enough through the opening 161 that it can be seen from the outside. In the activated state of the tightening element 150 (FIG. 2), it is located further inward and cannot be seen. Instead of the indicator 180, e.g., the connection 160, as shown in FIG. 8, can be provided with a seal 162, which is removed or broken for the purpose of admitting a pressure medium.

Also, the plug-type sleeve can be equipped with safety means that prevent the tightening element, without the pipe fitted into the plug-type sleeve, from being deformed inward from the end configuration. This can be achieved by, for example, a design of the links 153 and 154 that limits the mutual pivoting or tilting.

The plug-type sleeve according to exemplary embodiments can be detached again quite simply by applying a differential pressure via the connection 160. In this case, the bags 155a and 155b that are integral with the sealing hose 155 carry the links 153 and 154 radially outward, until the tightening element 150 has again reached its initial configuration according to FIG. 1. Owing to the axial shortening of the tightening element that is produced in this case, the O-ring 140 is depressurized again, so that the pipe section 2a can be extracted virtually effortlessly from the plug-type sleeve M.

Figure 6:
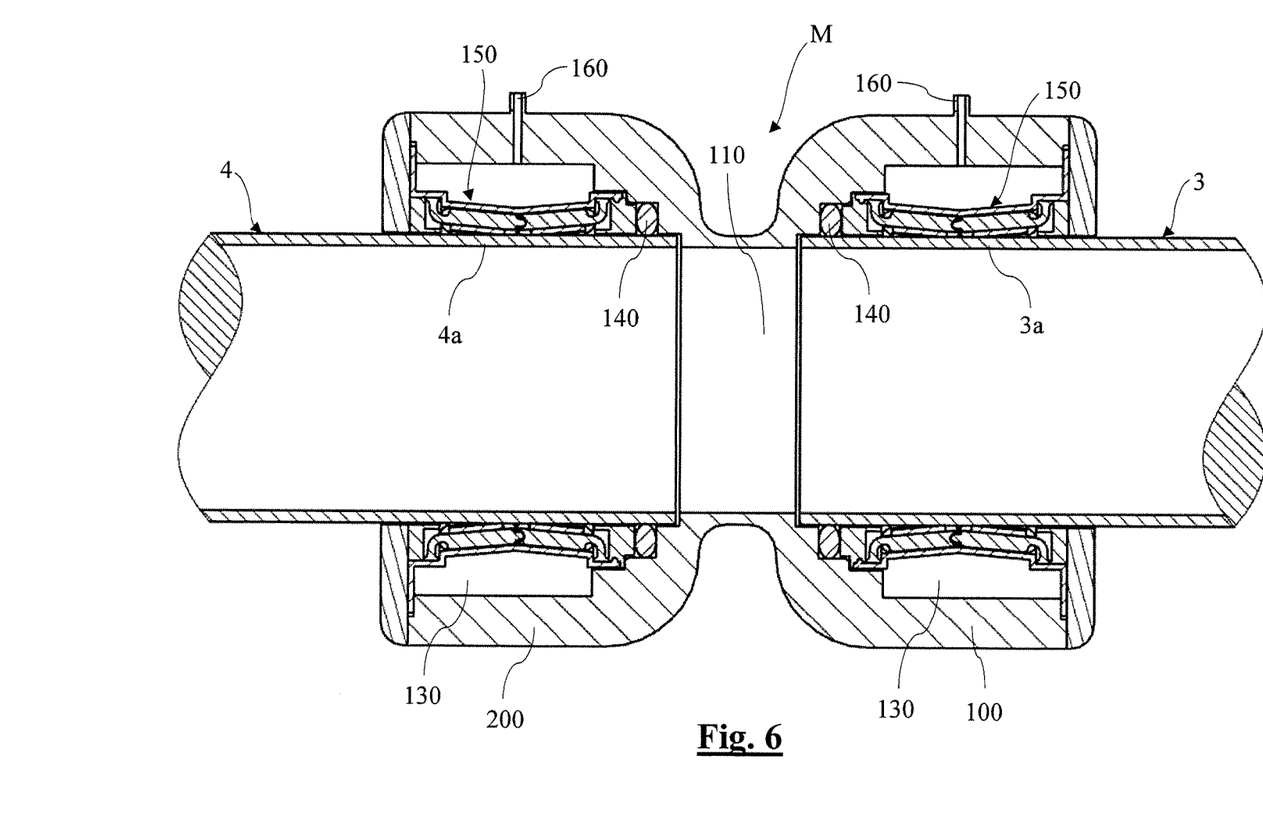
FIG. 6 shows a longitudinal section through another exemplary embodiment of a plug-type sleeve according to the present disclosure in the clamped state.

FIG. 6 shows an exemplary embodiment of the plug-type sleeve according to the present disclosure, in which the plug-type sleeve M is designed and configured as a separate part and connects two pipes 3 and 4.

According to this embodiment, the plug-type sleeve M includes two ends 100 and 200, which are designed and equipped identically to the end 100 of the plug-type sleeve according to FIGS. 1 and 2. The two ends 100 and 200 are arranged in mirror image and made in one piece. As an alternative, the two ends could also be designed as separate parts, and are connected to one another in a suitable way. The two ends 100 and 200 have a common through opening 110, into which one end section each 3a and 4a of the pipes 3 or 4 to be connected is fitted from opposite sides. Since the ends 100 and 200 of the plug-type sleeve are designed, configured and equipped identically to the end 100 shown in FIGS. 1 and 2, parts with the same function are also referred to with the same reference numbers as in FIGS. 1 and 2.

The admission of a pressure medium is carried out in this embodiment via two separate connections 160 arranged each at one of the ends 100 and 200. The chambers 130 of the two ends could also, however, be connected in a communicating manner, whereby then a single common connection would suffice for the admission of the pressure medium.

Figure 7:
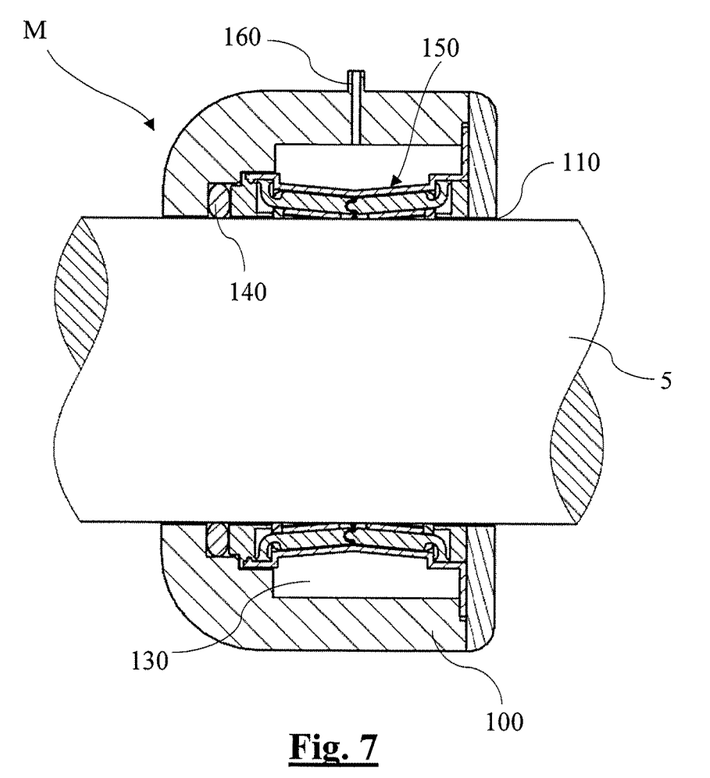
FIG. 7 shows a longitudinal section through another exemplary embodiment of a plug-type sleeve according to the present disclosure, also in the clamped state.

In the exemplary embodiment of FIG. 7, the plug-type sleeve is also designed as a separate part, which here forms a cable sleeve. The end 100 of the plug-type sleeve has a through opening 110, through which a cable 5 is run. Moreover, the plug-type sleeve is designed, configured and equipped identically to that in the embodiment of FIGS. 1 and 2, and parts with the same function are therefore also referred to with the same reference numbers as in FIGS. 1 and 2.

To increase the sealing action and the tightening force (extraction strength), two or more O-rings with tightening elements that are assigned in each case can also be provided almost in a series connection for each end of the plug-type sleeve. Due to the corresponding configuration of the pipe surface, the connection can also be configured by positive action. By applying means for increasing friction (e.g., sand) in the contact zone of the O-ring, the holding force can be amplified. The O-ring 140 can include (e.g., consists of) an elastomeric material, but for special cases of operation can also include (e.g., consist of) hard rubber, metal, or a material other than elastomeric plastic. The O-ring can also be made hollow. The O-ring can also be made from a material with a special high-adhesion coefficient (in relation to the object or pipe to be held), whereby this property can be achieved by, e.g., adding special substances (e.g., sand) to the starting material in the production of the O-ring.

An exemplary improvement of the sealing action or increase in the extraction force can also be achieved by a friction-increasing surface structure of the objects or pipes to be clamped in the area of the clamping point, for example, by providing grooves or by applying sand or the like.

In the above-described exemplary embodiments, the tightening element 150 is equipped with plate-like links 153 and 154. Of course, other forms of production of the tightening element are also possible, as long as it is ensured that by inward deformation of the tightening element owing to a pressure medium being imposed on it externally, an axial elongation of the tightening element is achieved, and the tightening element is made stiff enough to transfer the necessary tightening force to the O-ring. For example, the tightening element can also be made in one piece; e.g., from a suitable plastic or from metal.

As is evident from the explanations above, the securing and sealing of the pipe is done by an axially-pressed rubber-elastic element (O-ring). Owing to the application of a force of a liquid or gaseous medium under overpressure on a surface (jacket of the tightening element), a primary force that acts inward radially to the tubular axis is generated. A mechanical transmission element (formed by the links of the tightening element) transmits and amplifies this force and directs it in the direction parallel to the tubular axis on the clamping and sealing element (O-ring). Holding and sealing functions are performed by the same rubber-elastic element.

The pipe-like tightening element (round or polygonal) can include (e.g., consist of) multiple individual links that are directed parallel to the tubular axis, which are designed in such a way that when acted upon by a force that acts radially outward, they cause an elongation in the direction of the axis, and in this case force can be exerted. These links are designed and configured in such a way that in the transmission of the force that acts radially outward, a strong conversion into an axially directed force takes place.

These links are designed in such a way that when a specific linear expansion is exceeded, these elements (almost completely) maintain their length (snap function) and do not spring back into place even when the externally-acting force caused by the pressure medium is removed.

The pipes can be effortlessly joined. The mechanical connection process does not produce any external reaction forces or torque. The connection requires only minimal preparation (cutting into lengths and optionally cleaning cut edges). After the connection process is carried out, no cooling or curing time is necessary. The connection can be subjected to load immediately, and the procedure can thus be continued at once.

Figure 9:
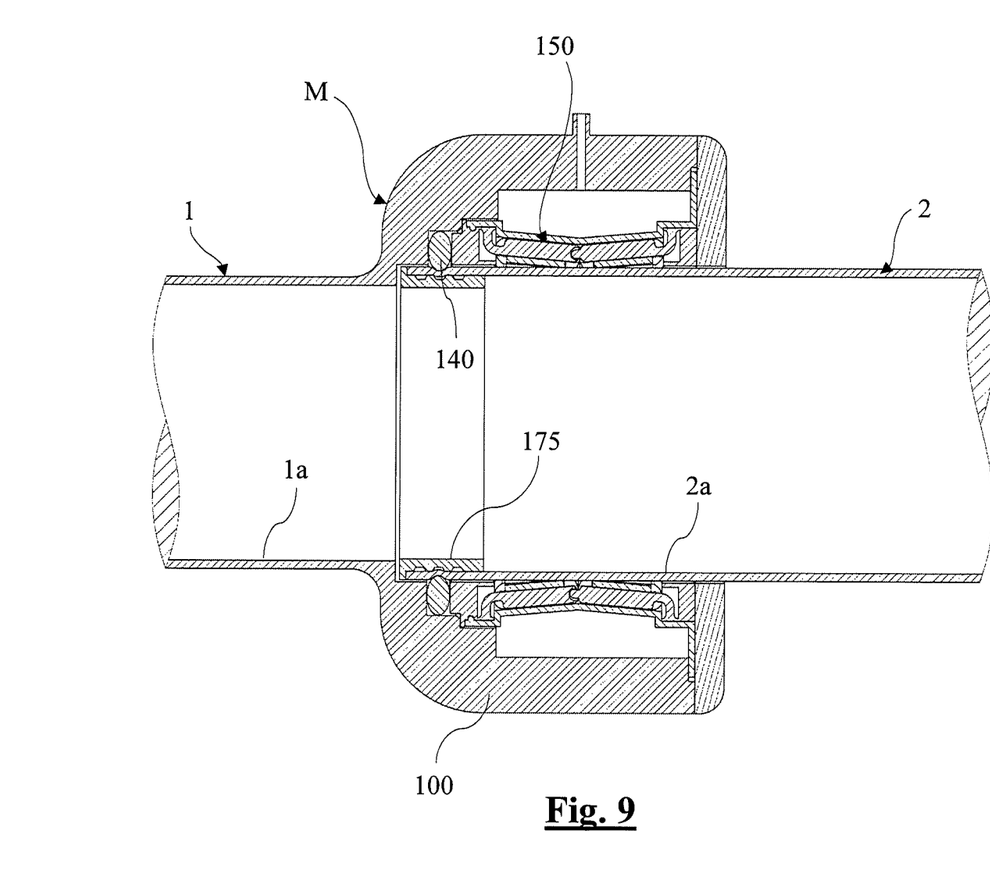
FIG. 9 shows a longitudinal section through an exemplary embodiment of a plug-type sleeve according to the present disclosure in the clamped state.

The rough surface pressing on the clamped plastic pipe leads to a partial tapering section in the pipe, which leads to a quasi-positive composite. If this tapering section is undesirable or too large, the inner wall of the pipe can be reinforced with a support sleeve 175, as is depicted in the embodiment of FIG. 9. The support sleeve 175 can in this case also be designed structured in a friction-increasing manner on its outer surface; e.g., with grooves. Under the action of the clamping force, thin-walled pipes are adapted to the surface structure of the support sleeve, and thus an action that increases the extraction force is exerted. Moreover, the plug-type sleeve of FIG. 9 is designed and equipped identically to the embodiment of FIGS. 1 and 2, and parts with the same function are therefore also referred to with the same reference numbers as in FIGS. 1 and 2.

Figures 10, 11, 12, 13:
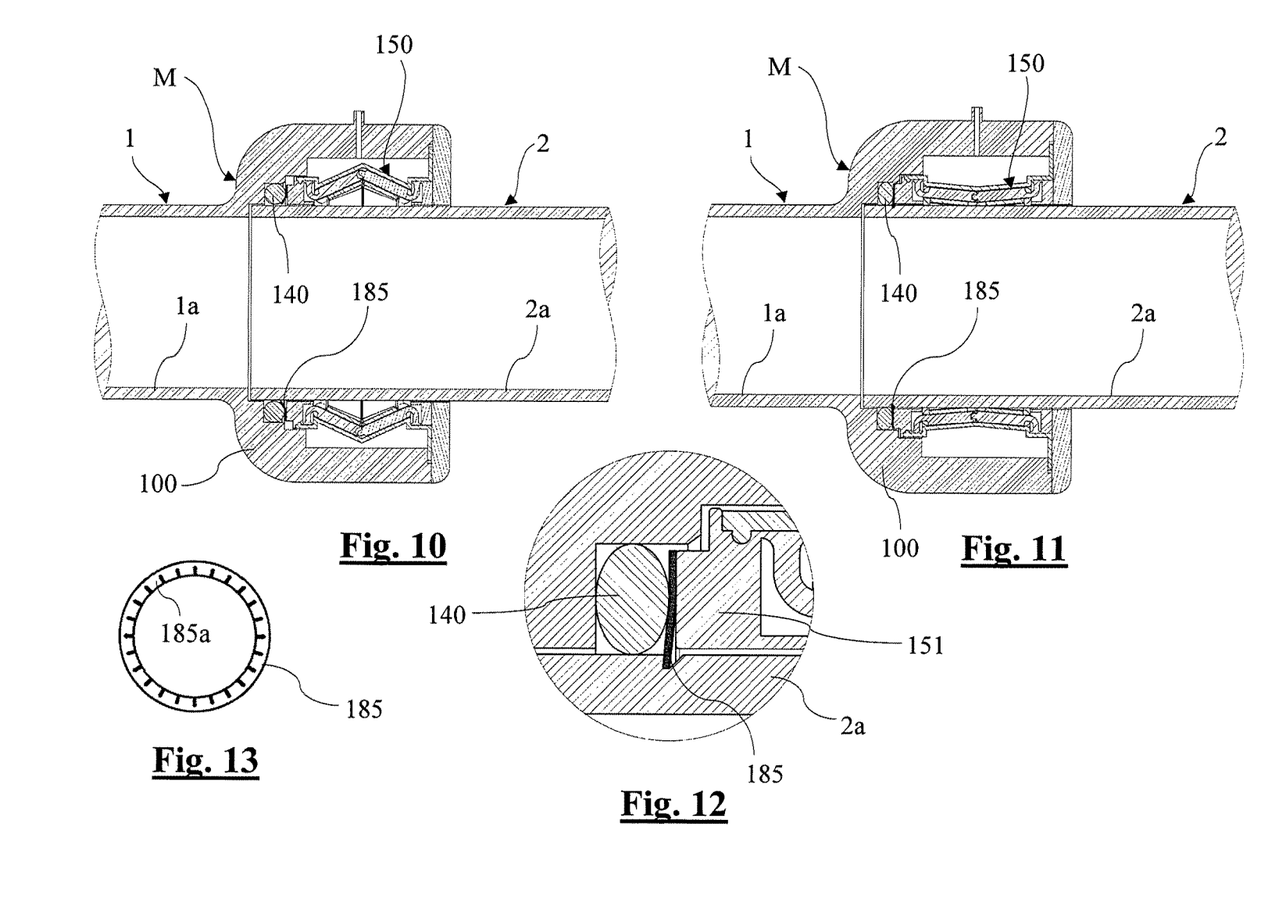
FIG. 10 shows a longitudinal section through exemplary embodiment of a plug-type sleeve according to the present disclosure in the unclamped state.
FIG. 11 shows a longitudinal section through exemplary embodiment of a plug-type sleeve according to the present disclosure in the clamped state.
FIG. 12 shows a detail section of the plug-type sleeve according to FIG. 11.
FIG. 13 shows a clamping safety washer.

FIGS. 10-13 show a variant of the plug-type sleeves according to the present disclosure, in which a clamping safety washer 185 is arranged between the clamping element 150 and the O-ring 140 for further increasing the extraction force. The clamping safety washer 185 is depicted in FIG. 13 (scaled-down) in top view. Moreover, the exemplary plug-type sleeve of FIGS. 10-12 is designed and equipped identically to the embodiment of FIGS. 1 and 2, and parts with the same function are therefore also referred to with the same reference numbers as in FIGS. 1 and 2.

In known manner, the clamping safety washer 185 can have teeth or claws 185a facing inward and bent out from the washer plane, which, when the tightening element 150 is in the non-activated state, do not touch or only quite lightly touch the surface of the pipe section 2a (FIG. 10). When the tightening element 150 is clamped (FIG. 11), the clamping safety washer 185 becomes deformed, whereby the teeth or claws 185a thereof become buried in the surface of the pipe section 2a, as is evident from the detailed depiction in FIG. 12. As a result, the extraction strength is increased. Also, multiple clamping safety washers that are separated by spacer rings can be present.

FIGS. 14-17 show an exemplary embodiment of the plug-type sleeve as disclosed herein, in which instead of an O-ring, an annular element 190 is provided as a clamping element. Moreover, the plug-type sleeve of FIGS. 14-17 is designed, configured and equipped identically to the embodiment of FIGS. 1 and 2, and parts that have the same function are therefore also referred to with the same reference numbers as in FIGS. 1 and 2.

Figure 14:
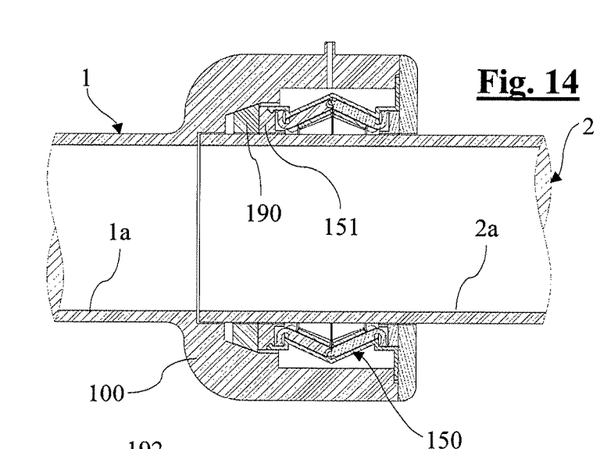
FIG. 14 shows a longitudinal section through exemplary embodiment of a plug-type sleeve according to the present disclosure in the unclamped state.
Figure 16:
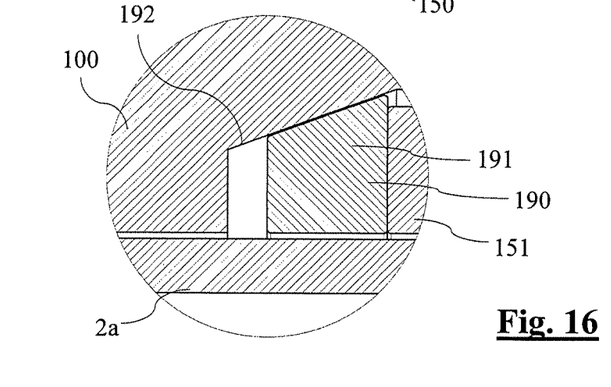
FIG. 16 shows a detail view of the plug-type sleeve according to FIG. 14.

The annular element 190 has a conical outside surface 191, which is tapered in the direction away from the tightening element 150. In the end 100 of the plug-type sleeve, a mirror-inverted mating surface 192 is provided, which works together with the cone surface 191 of the annular element 190. The (axially essentially incompressible) annular element 190 is located adjacent to the first carrier ring 151 of the tightening element 150. In the non-activated state of the tightening element 150, the inside diameter of the annular element 190 is slightly larger than the outside diameter of the end section 2a of the pipe 2 that is to be held (FIG. 14 and detailed depiction in FIG. 16).

Figure 15:
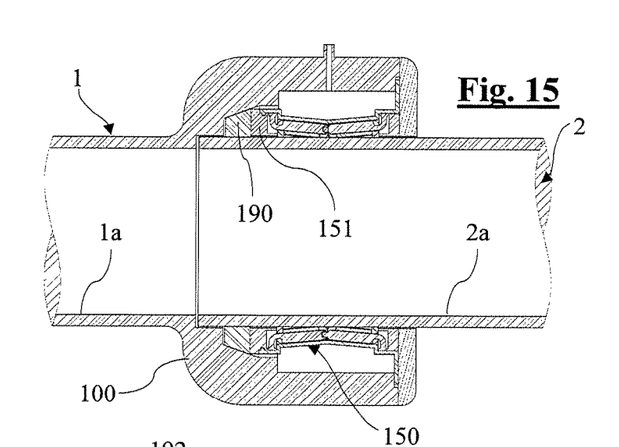
FIG. 15 shows a longitudinal section through exemplary embodiment of a plug-type sleeve according to the present disclosure in the clamped state.
Figure 17:
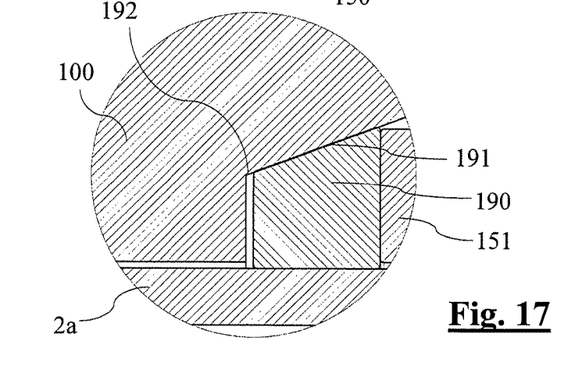
FIG. 17 shows a detail view of the plug-type sleeve according to FIG. 15.
Figure 18:
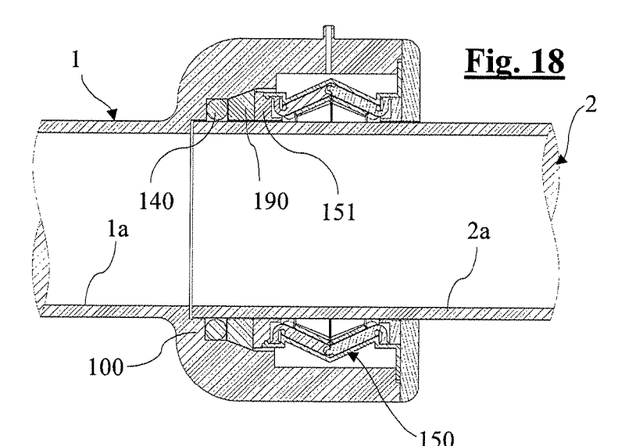
FIG. 18 shows a longitudinal section through exemplary embodiment of a plug-type sleeve according to the present disclosure in the unclamped state.
Figure 19:
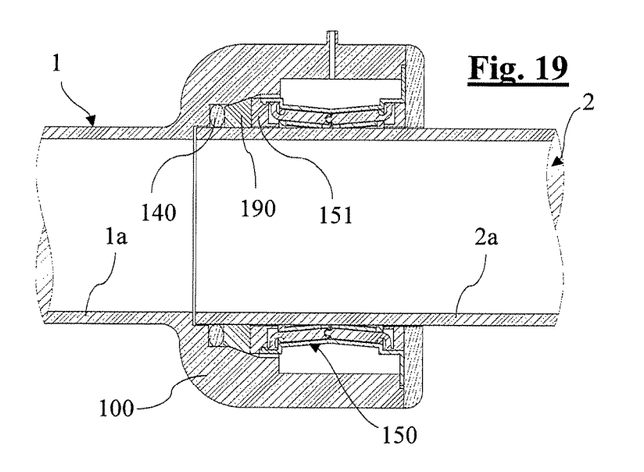
FIG. 19 shows a longitudinal section through exemplary embodiment of a plug-type sleeve according to the present disclosure in the clamped state.
Figure 20:
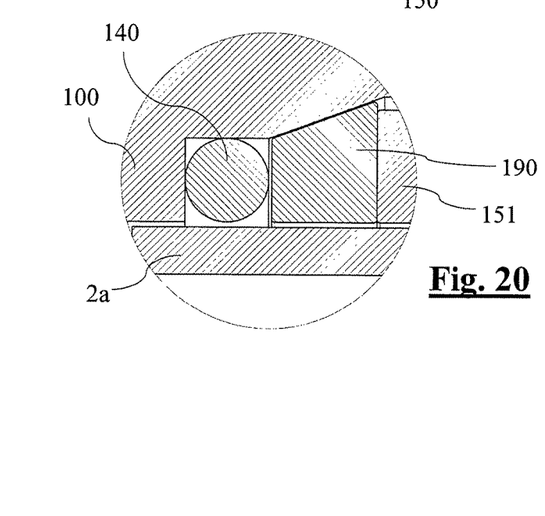
FIG. 20 shows a detail view of the plug-type sleeve according to FIG. 18.
Figure 21:
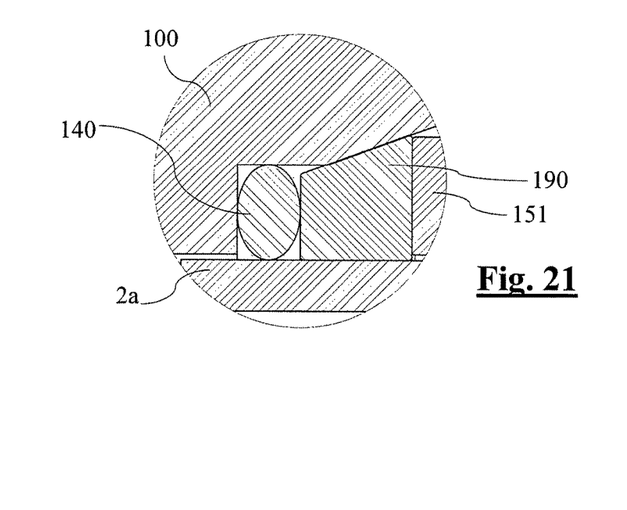
FIG. 21 shows a detail view of the plug-type sleeve according to FIG. 19.

When activating the tightening element 150, the annular element 190 is moved axially based on the change in length of the tightening element 150, whereby the annular element 190 with its conical outer surface 191 slides along the mating surface 192 and in this case is radially squeezed, so that it presses snugly on the outer surface of the end section 2a of the pipe 2 and thus tightly clamps the latter (FIG. 15 and detailed depiction in FIG. 17). The annular element can also optionally be designed in a segmented manner (e.g., depending on the type of a drill chuck).

FIGS. 18-21 show another exemplary embodiment of the plug-type sleeve according to the present disclosure, which depicts a combination of the embodiments according to FIGS. 1 and 2 or FIGS. 14-17. In this embodiment, both an O-ring 140 and an annular element 190 are present as a clamping element. Otherwise, the plug-type sleeve of FIGS. 18-21 is designed and equipped identically to the embodiment of FIGS. 1 and 2, and parts that have the same function are therefore also referred to with the same reference numbers as in FIGS. 1 and 2. In this variant embodiment, the tightening element 150 moves the annular element 190, and the O-ring 140 thus compresses the latter, as is illustrated in particular in the detailed depictions of FIGS. 20 and 21.

Of course, the embodiments of FIGS. 6 and 7 can also be correspondingly designed like the variant embodiments according to FIGS. 9-21.

The plug-type sleeve according to the present disclosure is especially suitable for the production of pipe connections. It can be also be used, for example, cable fitting or the like. The plug-type sleeve is not limited to the circular cross-sections of the parts to be connected. Furthermore, the plug-type sleeve can also be used as a cover or a protective cap.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A plug-type sleeve for fastening to an object that is in the form of a rod, cable or pipe, the sleeve comprising:
   a first end, which has an opening for accommodating a section of an object; and
   a clamping element which can be placed on an outer surface of the section, the clamping element having a sleeve-like tightening element configured to be coupled to the clamping element in a longitudinal direction of the plug-type sleeve for imposing an axial force on the clamping element, the clamping element being molded and configured so that when an axial force is imposed, the clamping element will be constricted in a radial direction, the tightening element being configured and arranged so that a fluid pressure medium when externally imposed will produce an axial elongation of the tightening element and thus the imposing of an axial force on the clamping element,
   wherein the tightening element is configured to be converted from an initial configuration via a dead-center configuration into an end configuration, whereby a length of the tightening element in the initial configuration is smallest, in the dead-center configuration is largest, and in an end configuration smaller than in the dead-center configuration but larger than in the initial configuration, wherein the tightening element is configured to be curved or bent outward in its initial configuration, to stretch out in its dead-center configuration, and to be curved or bent inward in its end configuration.

2. The plug-type sleeve according to claim 1, wherein the tightening element has a snap function, whereby the tightening element is configured to switch stepwise from its dead-center configuration into its end configuration and remain in the end configuration without a force being imposed externally.

3. The plug-type sleeve according to claim 2, wherein the tightening element is configured to be curved or bent outward like a barrel in its initial configuration, to stretch out in its dead-center configuration, and to be curved or bent inward in its end configuration.

4. The plug-type sleeve according to claim 3, wherein the first end is configured with a circumferential chamber, wherein the tightening element is arranged in the chamber in a longitudinal direction next to the clamping element and extends in the longitudinal direction from a frontal boundary area of the chamber to the clamping element, and wherein the tightening element, at least in a middle section, is configured to deform radially inward, whereby the radial inward deformation of the tightening element will produce an elongation in the longitudinal direction, and whereby the axial force will be imposed on the clamping element by the elongation of the tightening element.

5. The plug-type sleeve according to claim 4, wherein the tightening element has a first carrier ring and, at a distance to the first carrier ring, a second carrier ring, and, between the first and second carrier rings, a number of pairs of plate-like links, whereby in each case, the links of one pair are arranged next to one another in a longitudinal direction and are linked in such a way as to be able to pivot toward one another, and whereby, a first link of one pair on the first carrier ring and another link of one pair on the second carrier ring are linked in such a way as to be able to tilt, and whereby, the first and the other links of one pair are arranged inclined toward one another.

6. The plug-type sleeve according to claim 5, wherein the clamping element has an O-ring that is arranged in a circumferential groove, wherein the O-ring is supported on a circumferential surface of the groove, and on a collar of the groove, and wherein the tightening element is arranged in the chamber in a longitudinal direction next to the O-ring, and extends in the longitudinal direction from a front boundary surface of the chamber up to the O-ring, whereby the O-ring is axially compressed by elongation of the tightening element.

7. The plug-type sleeve according to claim 6, wherein the clamping element has a conical annular element on its exterior, which works together with a mirror-inverted conical mating surface made in the first end, so that the annular element will move axially by the axial force being imposed relative to the mating surface and is constricted radially.

8. The plug-type sleeve according to claim 1, wherein the first end is configured with a circumferential chamber, wherein the tightening element is arranged in the chamber in a longitudinal direction next to the clamping element and extends in the longitudinal direction essentially from a frontal boundary area of the chamber to the clamping element, and wherein the tightening element, at least in a middle section, is configured to deform radially inward, whereby the radial inward deformation of the tightening element will produce an elongation in the longitudinal direction, and whereby the axial force will be imposed on the clamping element by the elongation of the tightening element.

9. The plug-type sleeve according to claim 8, comprising: a connection for a fluid pressure medium that empties into the circumferential chamber.

10. The plug-type sleeve according to claim 1, wherein the tightening element has a first carrier ring and, at a distance to the first carrier ring, a second carrier ring, and, between the first and second carrier rings, a number of pairs of plate-like links, whereby in each case, the links of one pair are arranged next to one another in a longitudinal direction and are linked in such a way as to be able to pivot toward one another, and whereby in each case, a first link of one pair on the first carrier ring and another link of one pair on the second carrier ring are linked in such a way as to be able to tilt, and whereby in each case, the first and the other links of one pair are arranged inclined toward one another.

11. The plug-type sleeve according to claim 10, wherein the links and the carrier rings are surrounded by an elastic sealing hose.

12. The plug-type sleeve according to claim 1, wherein the clamping element has an O-ring that is arranged in a circumferential groove, wherein the O-ring is supported on a circumferential surface of the groove, and on a collar of the groove, and wherein the tightening element is arranged in the chamber in a longitudinal direction next to the O-ring, and extends in the longitudinal direction from a front boundary surface of the chamber up to the O-ring, whereby the O-ring is axially compressed by elongation of the tightening element.

13. The plug-type sleeve according to claim 1, wherein the clamping element has a conical annular element on its exterior, which works together with a mirror-inverted conical mating surface made in the first end, so that the annular element will move axially by the axial force being imposed relative to the mating surface and constricted radially.

14. The plug-type sleeve according to claim 1, comprising:
at least one clamping safety washer between the clamping element and the tightening element.

15. The plug-type sleeve according to claim 1, comprising:
a support sleeve that can be fitted into a tube-like object.

16. The plug-type sleeve according to claim 1, comprising:
an indicator, which indicates whether the tightening element occupies its initial configuration or its end configuration.

17. The plug-type sleeve according to claim 1, comprising:
a second end that is equipped with a first end that is in one piece, or is connected and is essentially the same as the first end.

18. The plug-type sleeve according to claim 17, wherein the clamping elements in the first end and the second end are arranged on sides that face one another.

19. A plug-type sleeve for fastening to an object that is in the form of a rod, cable or pipe, the sleeve comprising:
a first end, which has an opening for accommodating a section of an object; and
a clamping element which can be placed on an outer surface of the section, the clamping element having a sleeve-like tightening element configured to be coupled to the clamping element in a longitudinal direction of the plug-type sleeve for imposing an axial force on the clamping element, the clamping element being molded and configured so that when an axial force is imposed, the clamping element will be constricted in a radial direction, the tightening element being configured and arranged so that a fluid pressure medium when externally imposed will produce an axial elongation of the tightening element and thus the imposing of an axial force on the clamping element, wherein the first end is configured with a circumferential chamber, wherein the tightening element is arranged in the chamber in a longitudinal direction next to the clamping element and extends in the longitudinal direction from a frontal boundary area of the chamber to the clamping element, and wherein the tightening element, at least in a middle section, is configured to deform radially inward, whereby the radial inward deformation of the tightening element will produce an elongation in the longitudinal direction, and whereby the axial force will be imposed on the clamping element by the elongation of the tightening element.

20. A plug-type sleeve for fastening to an object that is in the form of a rod, cable or pipe, the sleeve comprising:

a first end, which has an opening for accommodating a section of an object; and a clamping element which can be placed on an outer surface of the section, the clamping element having a sleeve-like tightening element configured to be coupled to the clamping element in a longitudinal direction of the plug-type sleeve for imposing an axial force on the clamping element, the clamping element being molded and configured so that when an axial force is imposed, the clamping element will be constricted in a radial direction, the tightening element being configured and arranged so that a fluid pressure medium when externally imposed will produce an axial elongation of the tightening element and thus the imposing of an axial force on the clamping element, wherein the tightening element has a first carrier ring and, at a distance to the first carrier ring, a second carrier ring, and, between the first and second carrier rings, a number of pairs of plate-like links, whereby in each case, the links of one pair are arranged next to one another in a longitudinal direction and are linked in such a way as to be able to pivot toward one another, and whereby in each case, a first link of one pair on the first carrier ring and another link of one pair on the second carrier ring are linked in such a way as to be able to tilt, and whereby in each case, the first and the other links of one pair are arranged inclined toward one another.

* * * * *